No. 674,946. Patented May 28, 1901.
J. O. THOMPSON.
SELF FEEDER.
(Application filed Oct. 26, 1900.)
(No Model.) 2 Sheets—Sheet 2.

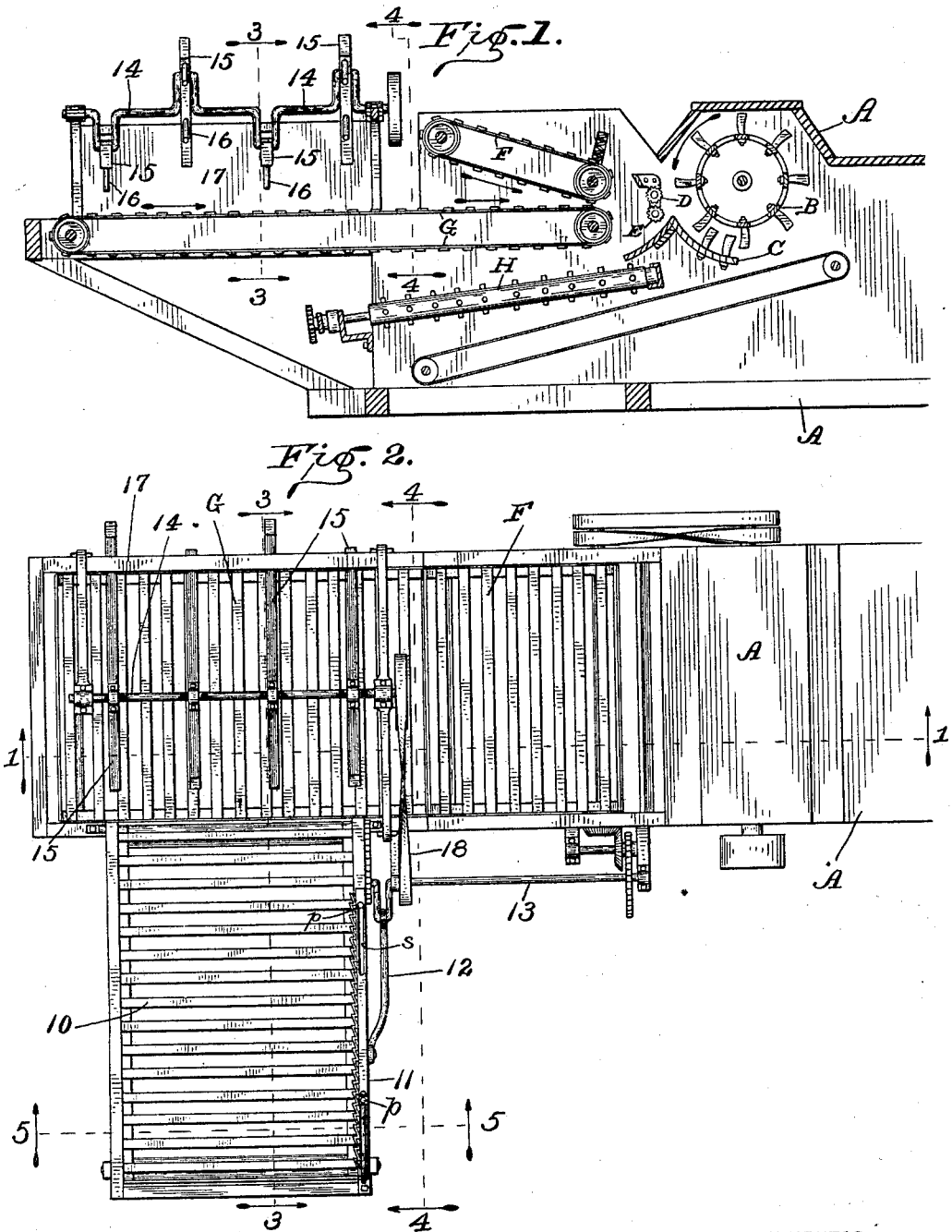

WITNESSES: INVENTOR
C. S. Frye. John O. Thompson,
J. A. Walsh. BY
Chester Bradford,
ATTORNEY

THE NORRIS PETERS CO., PHOTO-LITHO., WASHINGTON, D. C.

UNITED STATES PATENT OFFICE.

JOHN O. THOMPSON, OF MULBERRY, INDIANA.

SELF-FEEDER.

SPECIFICATION forming part of Letters Patent No. 674,946, dated May 28, 1901.

Application filed October 26, 1900. Serial No. 34,604. (No model.)

*To all whom it may concern:*

Be it known that I, JOHN O. THOMPSON, a citizen of the United States, residing at Mulberry, in the county of Clinton and State of Indiana, have invented certain new and useful Improvements in Self-Feeders, of which the following is a specification.

The object of my said invention is to provide an efficient distributing and feeding apparatus for cylinder-machines, especially that class of machines known as "corn-huskers" and "fodder-shredders."

A machine embodying said invention will be first fully described and the novel features thereof then pointed out in the claim.

Figure 3:
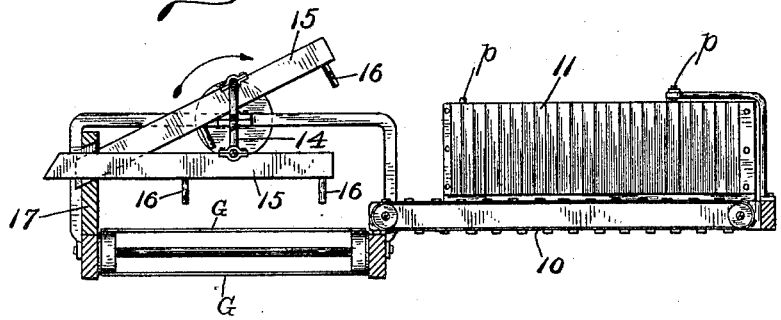
Figure 4:
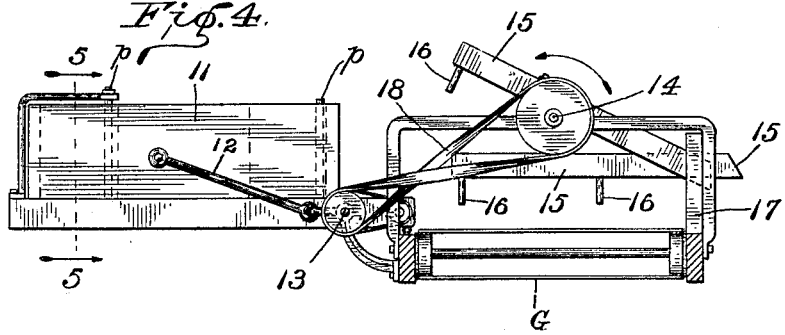
Figure 5:
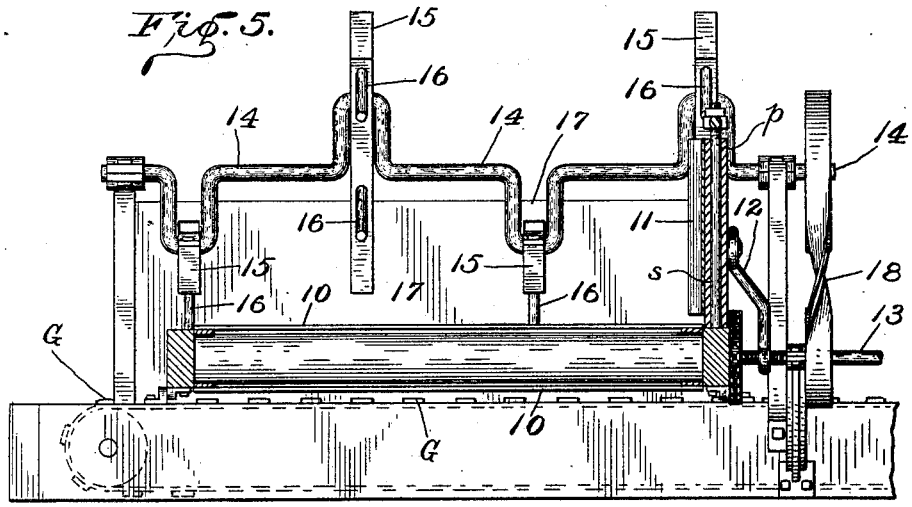

Referring to the accompanying drawings, which are made a part hereof, and on which similar reference characters indicate similar parts, Figure 1 is a longitudinal vertical sectional view, as seen when looking in the direction indicated by the arrows from the dotted line 1 1 in Fig. 2, of a feeder embodying my said invention, together with so much of the corn-husker and fodder-shredder to which it is applied as will serve to illustrate its arrangement and operation; Fig. 2, a top or plan view of the same; Fig. 3, a transverse vertical sectional view looking in the direction indicated by the arrows from the dotted lines 3 3 in Figs. 1 and 2; Fig. 4, a transverse sectional view when looking in the direction indicated by the arrows from the dotted line 4 4 in Figs. 1 and 2; and Fig. 5 a transverse sectional view, on an enlarged scale, as seen when looking in the direction indicated by the arrows from the dotted line 5 5 in Figs. 2 and 4, showing especially those parts involved in my present invention.

In said drawings the portions marked A represent the framework and casing, B the cylinder, C the concave, D and E the snapping-rolls, F and G the feeder carrier-belts, and H the husking-rolls, of a corn-husking and fodder-shredding machine.

So far the parts illustrated are not a part of my present invention, and as the same are shown merely for purposes of illustration they will not be further described herein except incidentally in describing the invention.

Arranged alongside the lower feeder carrier-belt G, and preferably somewhat above it, is the side carrier-belt 10, which is adapted to receive the corn and carry the same onto the belt G. On that side of this belt 10 nearest the cylinder of the machine is an upright reciprocating plate 11, the surface of which is serrated or notched and is adapted to engage with the butts of the stalks of corn and push them forward. This is necessary, for the reason that the butts of the stalks are heavier and more bulky than the tops and the movement in feeding them forward needs to be accelerated. This reciprocating side or plate 11 is actuated by a pitman 12, driven from a crank-shaft 13, which in turn is driven from any convenient shaft of the machine. It is supported in upright position by suitable supports, as posts $p$, extending through slots $s$ in said plate.

Arranged above the carrier-belt G is a multiple crank-shaft 14, to which are secured a series of bars 15, which have raking projections or teeth 16. The rear ends of the bars 15 pass through suitable openings therefor in a side frame 17 (see especially Fig. 3) and are thus guided, as the crank-shaft 14 revolves in the direction indicated by the arrows in Figs. 3 and 4, to pull over the stalks of corn as they are delivered onto the belt G from the belt 10 and distributes them evenly out over said belt G, so that they will be carried forward in an even layer by said belt G and fed to the snapping-rolls D E and the cylinder B. The movement and operation of the bars 15 will be best understood from an inspection of Figs. 3 and 4, where one is shown in its extreme upper position and the other in its extreme lower position. The crank-shaft 14 is shown as driven by means of a belt 18 running to a pulley thereon from a corresponding pulley on the shaft 13.

By means of my invention I am able to feed a machine of the character in question by simply pushing the stalks onto the side table carrying the carrier-belt 10. The stalks are carried forward in bunches by said belt 10 and the corrugated reciprocating feeding-belt 11 until they are seized by the teeth 16 on the bars 15, which evenly distribute them over the carrier-belt G, whence they travel forward in the ordinary manner into the machine. This saves labor and secures uniformity or evenness of operation.

Having thus fully described my said inven- tion, what I claim as new, and desire to secure by Letters Patent, is—

The combination, in a corn-husking machine, with the husking and fodder-shredding mechanism, of a feeding mechanism for feeding the stalks and corn thereto, comprising a main feeding carrier-belt, the primary feeding carrier-belt arranged transversely thereto and adapted to deliver the stalks to said main carrier-belt, the corrugated upright reciprocating feeding-plate arranged alongside said primary feeding carrier-belt and adapted to accelerate the motion of the butts of the stalks laid thereon and thus deliver the same evenly to the said main carrier-belt, a multiple crank-shaft arranged above said main carrier-belt extending in the direction of its motion and opposite said primary carrier-belt, bars mounted on said crank-shaft and extending transversely of said main carrier-belt and provided with teeth, and a guide for the rear ends of said bars, whereby the same are controlled, said toothed bars being thereby caused to draw the stalks over as they are delivered from the primary carrier-belt and distribute them evenly over the main carrier-belt, substantially as set forth.

In witness whereof I have hereunto set my hand and seal at Indianapolis, Indiana, this 24th day of October, A. D. 1900.

JOHN O. THOMPSON. [L. S.]

Witnesses:
CHESTER BRADFORD,
JAMES A. WALSH.